(12) United States Patent
Kato

(10) Patent No.: US 9,557,752 B2
(45) Date of Patent: Jan. 31, 2017

(54) HOT WATER SUPPLY APPARATUS AND HEAT MEDIUM CONTROL METHOD

(75) Inventor: Kenji Kato, Fuji (JP)

(73) Assignee: PURPOSE COMPANY LIMITED, Fuji-shi (JP)

(*) Notice: Subject to any disclaimer, the term of this patent is extended or adjusted under 35 U.S.C. 154(b) by 990 days.

(21) Appl. No.: 12/711,646

(22) Filed: Feb. 24, 2010

(65) Prior Publication Data

US 2011/0203788 A1 Aug. 25, 2011

(51) Int. Cl.
*F24D 12/02* (2006.01)
*G05D 23/19* (2006.01)
*F24D 19/10* (2006.01)

(52) U.S. Cl.
CPC ............. *G05D 23/192* (2013.01); *F24D 12/02* (2013.01); *F24D 19/1012* (2013.01); *F24D 19/1051* (2013.01); *F24D 2200/18* (2013.01); *Y02B 30/14* (2013.01); *Y02B 30/745* (2013.01)

(58) Field of Classification Search
CPC ............. F24H 1/12; F24H 1/124; F24H 1/48; F24H 1/52; F24H 1/523; F24H 1/526
USPC .. 122/14.1–14.3, 20 R, 20 B, 32, 31.1, 15.1; 165/292, 293, 200, 270
See application file for complete search history.

(56) References Cited

U.S. PATENT DOCUMENTS

| | | | | |
|---|---|---|---|---|
| 3,544,005 A * | 12/1970 | Meier | ............................ | 237/8 D |
| 3,885,736 A * | 5/1975 | Amagami et al. | ............ | 237/8 R |
| 4,492,185 A * | 1/1985 | Kendall et al. | ................. | 122/32 |
| 4,671,459 A * | 6/1987 | Stapensea | ..................... | 237/8 R |
| 6,283,067 B1 * | 9/2001 | Akkala | .................... | F24D 12/02 |
| | | | | 122/14.22 |
| 7,069,976 B2 * | 7/2006 | Lindgren | ...................... | 165/11.1 |
| 7,322,532 B2 * | 1/2008 | Takada et al. | .................. | 236/11 |
| 2002/0000094 A1 * | 1/2002 | Kuroki | .................... | F25B 9/008 |
| | | | | 62/197 |
| 2003/0234296 A1 * | 12/2003 | Rixen et al. | ..................... | 237/69 |
| 2004/0226521 A1 * | 11/2004 | Kang | ..................... | F23N 1/022 |
| | | | | 122/5.51 |

(Continued)

FOREIGN PATENT DOCUMENTS

| | | | |
|---|---|---|---|
| JP | 58-33050 A | 2/1983 | |
| JP | 5-26191 U | 4/1993 | |

(Continued)

OTHER PUBLICATIONS

JP 2007085582 A—Machine Translation.*
JP2006112785A—machine translation.*

*Primary Examiner* — Alissa Tompkins
*Assistant Examiner* — Nathaniel Herzfeld
(74) *Attorney, Agent, or Firm* — Westerman, Hattori, Daniels & Adrian, LLP

(57) ABSTRACT

A hot water supply apparatus using a heat medium provides a heat medium circulation path that circulates the heat medium, a heat medium pump that pumps the heat medium into the heat medium circulation path, a heat source that generates heat heating the heat medium, a heat medium heat exchanger that exchanges heat generated by the heat source for the heat medium, a hot water supply heat exchanger that exchanges heat of the heat medium circulating in the heat medium circulation path for clean water, and a control unit that sets the heat medium in the heat medium circulation path in a predetermined temperature and controls the rotating speed of the heat medium pump and the combustion amount of the heat source according to a heat requirement.

5 Claims, 11 Drawing Sheets

(56) References Cited

U.S. PATENT DOCUMENTS

| | | | |
|---|---|---|---|
| 2006/0283404 A1* | 12/2006 | Wen-Lung | 122/20 R |
| 2007/0257122 A1* | 11/2007 | Shimada | F23N 1/082 237/12 |
| 2008/0022946 A1* | 1/2008 | Inami et al. | 122/14.21 |
| 2008/0033651 A1* | 2/2008 | Inoue | F24H 1/52 702/3 |
| 2009/0257122 A1* | 10/2009 | Hara | G02B 5/005 359/507 |
| 2011/0315091 A1* | 12/2011 | Adachi et al. | 122/14.1 |

FOREIGN PATENT DOCUMENTS

| | | | | |
|---|---|---|---|---|
| JP | 2006112785 A | * | 4/2006 | |
| JP | 2007085582 A | * | 4/2007 | |
| JP | 2007147108 A | * | 6/2007 | |
| WO | WO 2007058410 A1 | * | 5/2007 | |

* cited by examiner

HOT WATER SUPPLY APPARATUS AND HEAT MEDIUM CONTROL METHOD

TECHNICAL FIELD

The present invention relates to a hot water supply apparatus which heats water such as clean water to supply hot water, and for example, relate to a hot water supply apparatus which exchanges heat of a heated heat medium for clean water to heat the clean water to a required temperature, and a heat medium control method therefor.

BACKGROUND ART

Conventionally, when clean water is heated to supply hot water, clean water is allowed to flow into a hot water supply apparatus from an entrance water side thereof, and heat of the clean water is exchanged directly for heat generated from a heat source such as a burner.

Concerning such a hot water supply apparatus, it is known that water is supplied to a heat exchanger disposed inside a water boiler, and combustion heat of a gas burner is exchanged for the water to provide hot water from an outgoing hot water pipe (for example, Japanese Laid-open Patent Publication No. 58-33050). It is also known that heat of clean water, which is supplied tap water processed by a water purifier, creating equipment that electrolyzes tap water to be able to generate alkaline water and acid water, etc., is exchanged for heat of a burner in a heat receiving pipe (for example, Japanese Laid-open Utility Model Publication No. 05-02619).

There is a case that tap water or the like taken into a hot water supply apparatus as clean water includes different components according to, for example, an area. If this difference is explained by a pH (Potential of Hydrogen) level, there exists the range of, for example, 5.8 to 8.6. When a pH level is very low, an acid level is high. Water of the very low pH level is not suitable to drink. When a pH level is high, an alkali level is high, and there may be a case that much lime is included as a component. If water of such high alkali level continues on being heated at high temperatures by a heat exchanger, there occurs possibility that the component of lime separates out in a heat exchanger. If a gap is generated between such separating component and a straight pipe of a heat exchanger, partial boiling may occur. Thus, there is a problem such that hot water at a desired temperature cannot be obtained.

Since a process such as filtration is executed on tap water in a water purification plant, impurities, etc. as the above do not multiply sharply. However, quality of supplied water is different according to an area because of difference in water quality before the process or in ability to purify water. For evening up water quality and supplying constant quality of water to a hot water supply apparatus, there are the problems of needing complicated devices and great cost.

Concerning such problems, there is no disclosure or suggestion thereof in Japanese Laid-open Patent Publication No. 58-33050 and Japanese Laid-open Utility Model Publication No. 05-026191, and no disclosure or suggestion about structure, etc. solving them are presented therein.

SUMMARY OF INVENTION

An object of the present invention is to provide a hot water supply apparatus so as not to generate partial boiling. Another object of the present invention is to attempt simplification of heating control, circulation control, etc. over a heat medium in addition to the above object.

To achieve the above objects, the present invention is a hot water supply apparatus that uses a heat medium, providing a heat medium circulation path, a heat medium pump, a heat source, a heat medium heat exchanger, a hot water supply heat exchanger and a control unit. The heat medium circulation path circulates the heat medium. The heat medium pump pumps the heat medium into the heat medium circulation path. The heat source generates heat heating the heat medium. The heat medium heat exchanger exchanges heat generated by the heat source for the heat medium. The hot water supply heat exchanger exchanges heat of the heat medium circulating in the heat medium circulation path for clean water. The control unit sets the heat medium in the heat medium circulation path in a predetermined temperature and controls the rotating speed of the heat medium pump and the combustion amount of the heat source according to a heat requirement.

To achieve the above objects, the hot water supply apparatus of the present invention may further include a clean water pipe path, an entrance temperature detection means and a flow rate detection means. The clean water pipe path allows the clean water to flow into a hot water supply heat exchanger side, and executes heat exchange to be introduced to an outgoing hot water side. The entrance temperature detection means detects an entrance temperature of the clean water. The flow rate detection means detects a flow rate of the clean water. The control unit sets the rotating speed of the heat medium pump from the set predetermined temperature of the heat medium and a heat requirement calculated based on the entrance temperature of the clean water, a set temperature of the clean water after heat exchange and a flow rate of the clean water.

To achieve the above objects, the hot water supply apparatus of the present invention may include a heat medium temperature detection means and an outgoing hot water temperature detection means. The heat medium temperature detection means detects a temperature of the heat medium. The outgoing hot water temperature detection means detects a temperature of the clean water after heat exchange. The control unit monitors a temperature of the heat medium in the heat medium circulation path and a temperature of the clean water after heat exchange, executes combustion control of the heat source if the heat medium is not a set predetermined temperature, and executes control of the rotating speed of the heat medium pump if the clean water after heat exchange is not a set temperature.

The hot water supply apparatus of the present invention may further include a mixing means. The mixing means mixes clean water heated by heat exchange and clean water before heat exchange. The control unit sets the clean water after heat exchange in a higher temperature than a set temperature of supplied hot water to execute heat exchange, sets a mixing ratio of the clean water before heat exchange in the mixing means based on a temperature of the clean water after heat exchange, a set temperature of supplied hot water and supplied hot water quantity to control the mixing means.

The hot water supply apparatus of the present invention may further include a tank and a timer. The tank accumulates the heat medium. The timer performs timekeeping of elapsed time after hot water supply is ended. The control unit controls the heat source and the heat medium pump after hot water supply is ended till a next hot water supply request occurs or a predetermined time elapses if the heat medium is under the predetermined temperature, and maintains a temperature of the heat medium in the heat medium circulation path and the tank within a predetermined range.

In the hot water supply apparatus of the present invention, the heat medium may be antifreeze. The heat medium heat exchanger and/or the hot water supply heat exchanger may provide a secondary heat exchanger that recovers latent heat from the heat of the heat source.

To achieve the above objects, a heat medium control method of a hot water supply apparatus of the present invention include a heat medium circulation process, a heat source operation process, a heat medium heat exchange process, a clean water heat exchange process and a control process. The heat medium circulation process pumps a heat medium into a heat medium circulation path to be circulated. The heat source operation process operates a heat source that generates heat heating the heat medium. The heat medium heat exchange process exchanges heat generated by the heat source for the heat medium by a heat medium heat exchanger. The clean water heat exchange process exchanges heat of the heat medium for clean water by a hot water supply heat exchanger. The control process sets a temperature of the heat medium in the heat medium circulation path in a predetermined temperature to control the rotating speed of a heat medium pump and a combustion amount of the heat source according to a heat requirement.

The heat medium control method of the present invention may further include an entrance water temperature detection process, a flow rate detection process and a control process. The entrance water temperature detection process detects an entrance temperature of the clean water in a clean water pipe path. The flow rate detection process detects a flow rate of the clean water that flows into the clean water pipe path. The control process sets the rotating speed of the heat medium pump from the set predetermined temperature of the heat medium in the heat medium circulation path and a heat requirement calculated based on the entrance temperature of the clean water, a set temperature of the clean water after heat exchange and a flow rate of the clean water.

The heat medium control method of the present invention may further include a heat medium temperature detection process, a temperature detection process and a control process. The heat medium temperature detection process detects a temperature of the heat medium. The temperature detection process detects a temperature of the clean water after heat exchange. The control process monitors a temperature of the heat medium in the heat medium circulation path and a temperature of the clean water after heat exchange, executing combustion control of the heat source if the heat medium is not a set predetermined temperature, and executing control of the rotating speed of the heat medium pump if the clean water after heat exchange is not a set temperature.

The heat medium control method of the present invention may include a mixing process, a heat exchange process and a control process. The mixing process mixes, by a mixing means, clean water heated by heat exchange and clean water before heat exchange. The heat exchange process sets the clean water after heat exchange in a higher temperature than a temperature of supplied hot water to execute heat exchange. The control process sets a mixing ratio of the clean water before heat exchange in the mixing means based on a temperature of the clean water after heat exchange, a set temperature of supplied hot water and a hot water supply quantity to control the mixing means.

The heat medium control method of the present invention may further include a timekeeping process and a control process. The timekeeping process performs timekeeping of elapsed time after hot water supply is ended. The control process operates the heat source and the heat medium pump after hot water supply is ended till a hot water supply request occurs or a predetermined time elapses if the heat medium is under the predetermined temperature to execute heating so as to maintain a temperature of the heat medium within a predetermined range.

The features and advantages of the above described hot water supply apparatus and heat medium control method of the present invention are listed as follows.

(1) Heating supplied clean water indirectly by a heat medium can prevent partial boiling irrelevantly to difference of water quality.

(2) A heat medium is heated by a heat source, and clean water is heated by heat of this heat medium. Thereby, combustion time of a heat source can be shortened to attempt high efficiency, reduction of NOx emission.

(3) The structure of executing heating control over a heat medium according to the rotating speed of a pump can execute simple control, and can quicken response to heating demand.

Other objects, features and advantages of the present invention are more clearly understood by referring to the attached drawings and each of embodiments.

DESCRIPTION OF EMBODIMENTS

First Embodiment

A first embodiment relates to a hot water supply apparatus which heats clean water by using a heat medium. Combustion control and circulation control of a heat medium are executed according to a calculated heat requirement.

Figure 1:
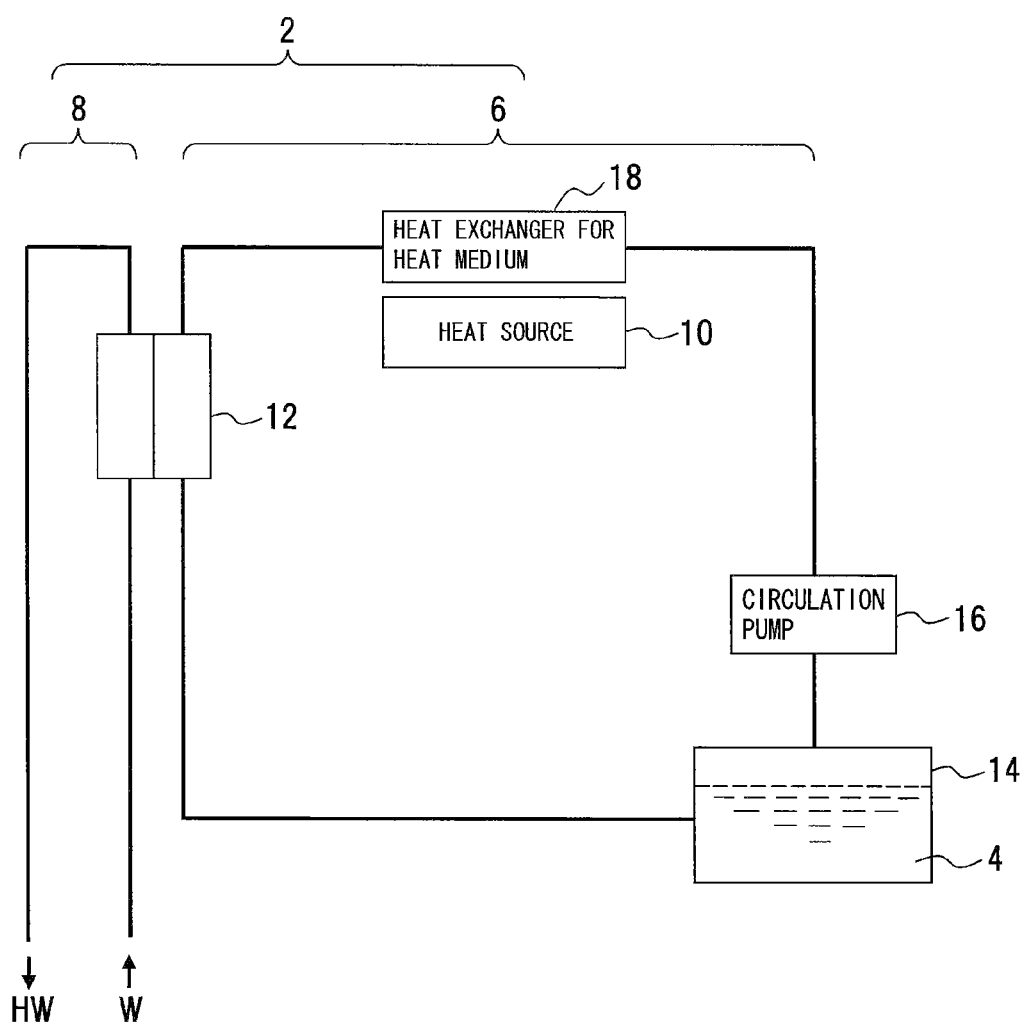
FIG. 1 depicts structure of a hot water supply apparatus according to a first embodiment.

This first embodiment is described with reference to FIG. 1. FIG. 1 depicts structure of a hot water supply apparatus according to the first embodiment. Structure depicted in FIG. 1 is one example, and the present invention is not limited to such structure.

This hot water supply apparatus 2 is one example of a hot water supply apparatus which heats clean water W by using a heated heat medium 4. The hot water supply apparatus 2 exchanges heat of the heat medium 4 at high temperatures for the clean water W to supply hot water HW heated to a set temperature. The hot water supply apparatus 2 includes, as depicted in FIG. 1, a heat medium circuit 6, a hot water supply circuit 8, a heat source 10 and a heat exchanger for supplying hot water 12.

The heat medium 4 is a medium for transmitting heat to the clean water W by heat exchange. For example, antifreeze or the like is used for the heat medium 4. That is, the heat medium 4 is a part of heating means which heats the clean water W. After heated by heat exchange for combustion exhaust or the like generated from the heat source 10, the heat medium 4 heats the clean water W to a desired temperature by exchanging heat for the clean water W.

The heat medium circuit 6 is one example of a heat medium circulation path circulating the heat medium 4. In the heat medium circuit 6, for example, an expansion tank 14, a circulation pump 16 and a heat exchanger for a heat medium 18 are provided. This heat medium circuit 6 connects to the heat exchanger for supplying hot water 12 to heat the clean water W by the heated heat medium 4. In this heat medium circuit 6, for example, a temperature sensor measuring the temperature of the heat medium 4 may be provided.

The expansion tank 14 adjusts the heat medium 4 flowing in the heat medium circuit 6 to a constant rate. The expansion tank 14 is one example of heat storage means retaining a constant temperature of the heat medium 4 flowing in the heat medium circuit 6 a certain temperature.

The circulation pump 16 is one example of a heat medium pump which pumps and circulates the heat medium 4 in the heat medium circuit 6. The rotating speed of this circulation pump 16 is controlled gradually or continuously in, for example, a hot water supply heating demand and warmth keeping control as described below.

The heat exchanger for a heat medium 18 is one example of heating means for the heat medium 4. The heat exchanger for a heat medium 18 executes heat exchange between, for example, combustion exhaust generated from the heat source 10, and the heat medium 4. This heat exchanger for a heat medium 18 may be constructed so as to, for example, recover sensible heat and latent heat of combustion exhaust.

The hot water supply circuit 8 is one example of a clean water pipe passage for taking the clean water W into the hot water supply apparatus 2 and heating the clean water W to supply hot water HW. The hot water supply circuit 8 is constituted of a circuit separate from the heat medium circuit 6. That is, the clean water W is allowed to flow into the heat exchanger for supplying hot water 12 to exchange heat for the heat medium 4, and hot water is supplied from a hot water tap, etc. This hot water supply circuit 8 may include, for example, a flow sensor which measures the rate of the clean water W flowing into an upstream side and a temperature sensor, which measures a water temperature.

The heat source 10 is one example of heating means of the heat medium 4. The heat source 10 generates, for example, combustion heat of a burner that burns oil and fuel gas, electric heating, and exhaust heat from an engine or fuel cell. Thus, as described above, generated heat is exchanged for the heat medium 4 by the heat exchanger for a heat medium 18. If a burner is used for the heat source 10, to what degree fuel gas is burned can be adjusted according to the supply of fuel gas.

The heat exchanger for supplying hot water 12 is one example of heat exchange means between the heat medium 4 and the clean water W. That is, the flow rate of the heat medium 4 is controlled in response to the heat requirement for the clean water W which flows into this heat exchanger for supplying hot water 12. Thereby, the clean water W can be heated to a desired temperature.

Figure 2:
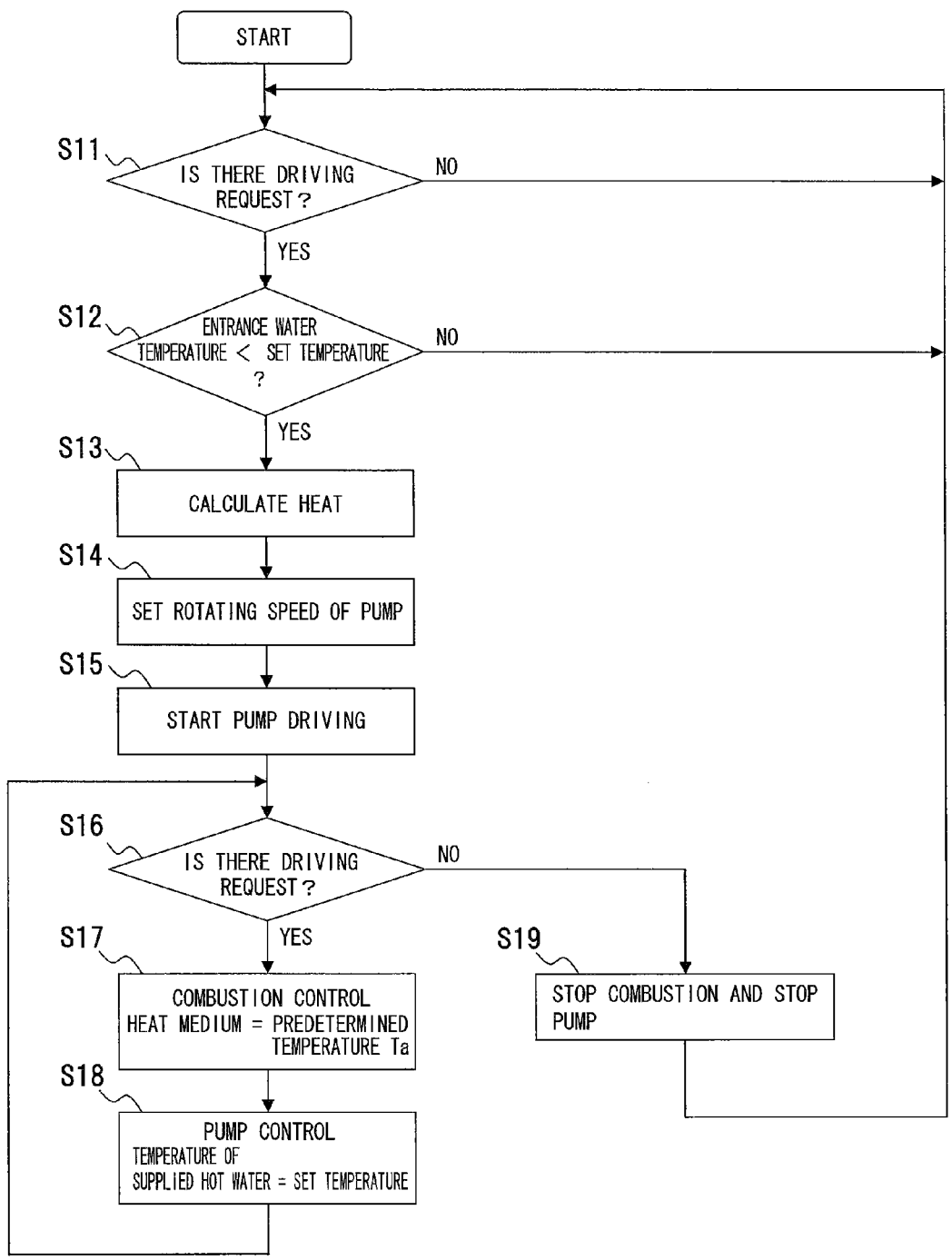
FIG. 2 is a flowchart depicting a hot water supply control process according to the first embodiment.
Figure 3:
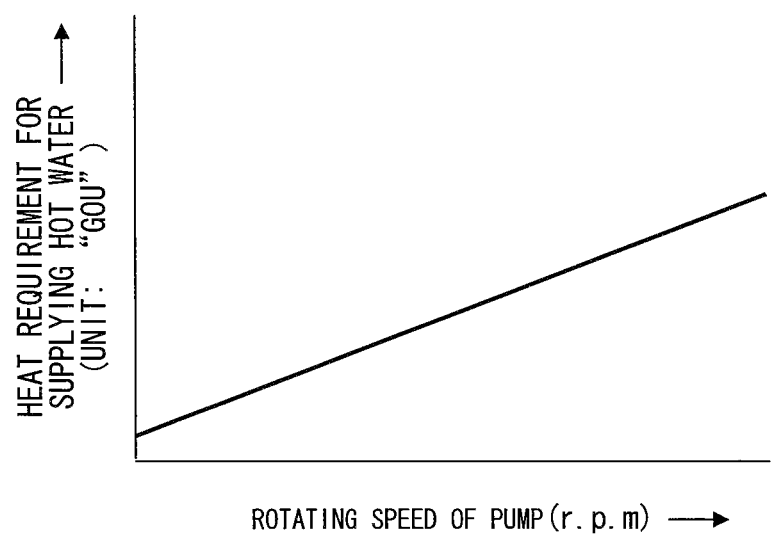
FIG. 3 is a characteristic diagram depicting the relationship between the heat requirement for supplying hot water and the rotating speed of a pump.

Hot water supply operation of a hot water supply apparatus is described with reference to FIGS. 2 and 3. FIG. 2 is a flowchart depicting a hot water supply control process according to the first embodiment and FIG. 3 is a characteristic diagram depicting the relationship between the heat requirement for supplying hot water and the rotating speed of a pump. Processing contents and processing procedure depicted in FIGS. 2 and 3 are one example, and the present invention is not limited to such structure.

This hot water supply control is one example of a heat medium control method or a hot water supply control method. In response to a driving request, the amount of heat necessary for heating outgoing hot water to a required temperature is calculated, and flow rate control of circulating the heat medium 4 and combustion control of a heat source are executed. This process therefore includes a driving request confirmation process (step S11), a clean water temperature comparison process (step S12), a heat requirement calculation process (step S13) and a pump control process (steps S14 and S15). Also, combustion control (step S16), pump control (step S17), etc. are included as temperature control during supplying hot water.

In confirmation of a driving request for the hot water supply apparatus 2 (step S11), confirmation is performed such that a flow sensor or the like detects a state of water passing through the hot water supply circuit 8 by turning on a hot water tap, not depicted, such as a faucet and shower. If the state of passing water is detected, it is determined that there is a driving request (YES of step S11). The temperature of the flowing clean water W is measured, and it is determined whether the entrance temperature of this clean water W is lower than a set temperature or not (step S12).

If the temperature of the clean water W is lower than a required set temperature as a result of the water temperature determination (YES of step S12), the hot water supply apparatus 2 is started to be driven. If the temperature of the clean water W is equal to or higher than a setting temperature (NO of step S12), the clean water W may be allowed to flow to an outgoing hot water side of the hot water supply circuit 8 without being heated.

In order to heat the clean water W to a set temperature, a heat requirement is calculated (step S13). The amount of this heat is calculated by, for example, deference between the entrance temperature of the clean water W and a set temperature, and the flow rate of supplied hot water.

At a heating means side, in order to supply calculated heat requirement, the flow rate of circulating the heat medium 4 which is heated to a predetermined temperature Ta is determined, and the rotating speed of the circulation pump 16 is set (step S14) to start to be driven (step S15). Combustion of the heat source 10 may be started along with driving the circulation pump 16. That is, since the heat medium 4 is set at, for example, 80° C. as the predetermined temperature Ta, the flow rate of circulation for providing a heat requirement may be calculated to determine the rotating speed of the circulation pump 16 according to the flow rate. In this case, for example, data such as a calculated rotating speed as depicted in FIG. 3 is stored in storing means, and the rotating speed of a pump may be controlled according to a heat requirement based on the data. Also, during continuous combustion, an entrance water temperature, a flow rate and an outgoing hot water temperature are monitored, and the rotating speed of a pump may be controlled by using stored data like the above.

After the start of supplying hot water, whether there is a driving request or not is monitored any time or every predetermined period (step S16). When a hot water supply request continues (YES of step S16), combustion control of the heat source 10 is executed (step S17) to heat the heat medium 4 so as to be the predetermined temperature Ta. The temperature in the hot water supply circuit 8 after heat exchange or an outgoing hot water temperature or the like is monitored, and control of the rotating speed of the circulation pump 16 is executed so that the hot water HW becomes a set temperature (step S18). That is, feedback control is performed.

When a hot water supply request is cancelled (NO of step S16), a combustion process of the heat source 10 and driving of the circulation pump 16 are stopped (step S19).

In the hot water supply circuit 8, the flow rate of the flowing clean water W may be adjusted as an adjustment process of the temperature of outgoing hot water. In addition, for example, the control may be executed so that high temperatures of the heat medium 4 in the expansion tank 14 are retained before the start of hot water supply driving. That is, if high temperatures of the heat medium 4 in the expansion tank 14 are retained, temperature rising time can be shortened in heating when hot water supply is started.

According to such structure, heating the clean water W with a heat medium indirectly can prevent partial boiling. Adjustment due to the difference of water quality according to an area is not necessary, thus, convenience is improved. By heating a heat medium with a heat source to heat clean water with the heat of this heat medium, combustion time of a heat source can be shortened to attempt high efficiency, reduction of NOx emission and power saving. Heating a heat medium according to the rotating speed of a pump can execute simple control, and can quicken response to heating demand.

Second Embodiment

A second embodiment provides a specific example of a hot water supply apparatus. The heat exchanger for a heat medium 18 of this hot water supply apparatus provides a secondary heat exchanger which recovers latent heat from the heat generated from a heat source. In the hot water supply circuit 8, a secondary heat exchanger recovering latent heat of a heat source is provided at, for example, an upper stream side than a heat exchanger for supplying hot water.

Figure 4:
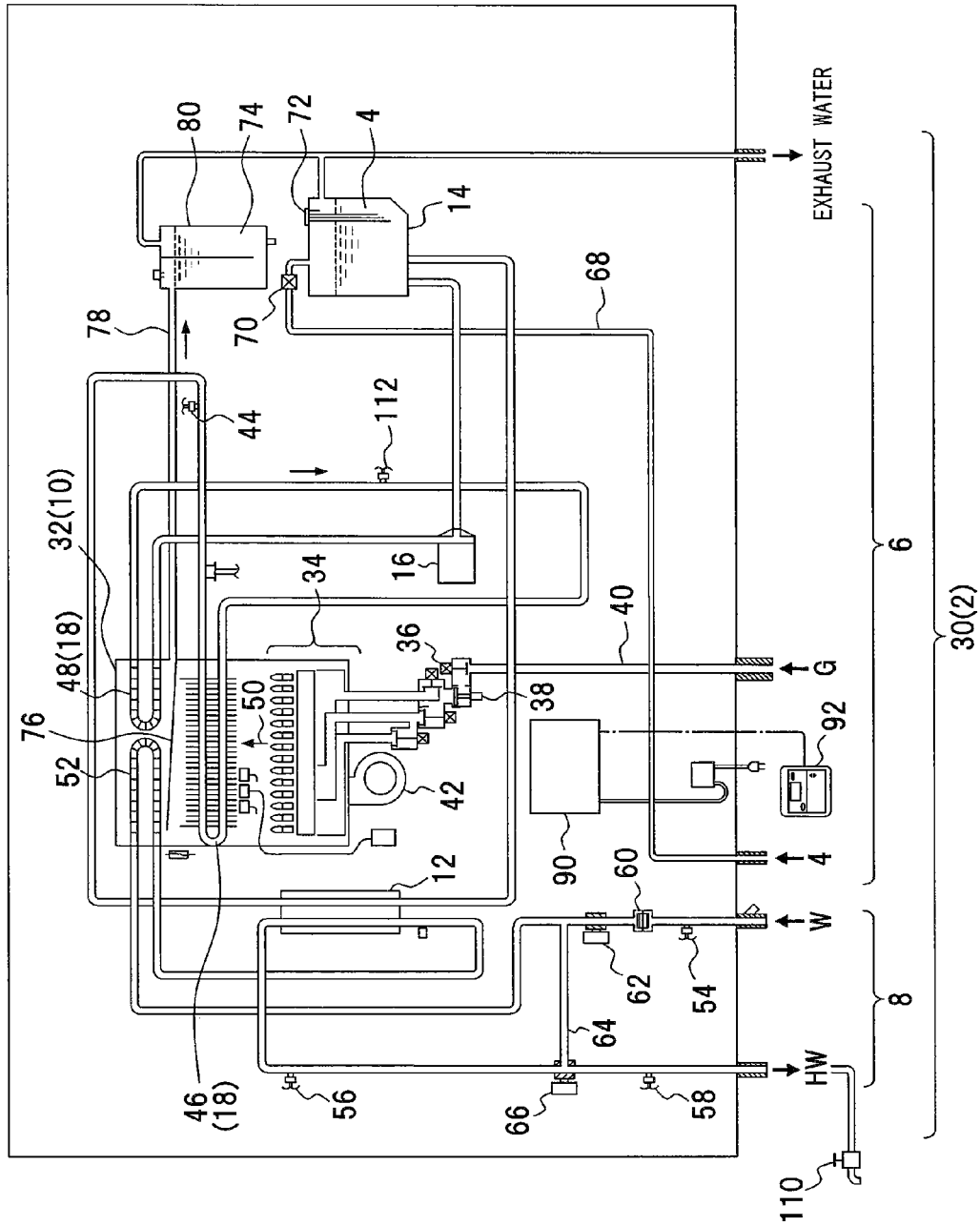
FIG. 4 depicts an example of structure of a hot water supply apparatus according to a second embodiment.

A hot water supply apparatus according to this second embodiment is described with reference to FIG. 4. FIG. 4 depicts structure of a hot water supply apparatus according to the second embodiment. Structure depicted in FIG. 4 is one example, and the present invention is not limited to such structure. In FIG. 4, the same components as those in FIG. 1 are denoted by the same reference numerals, and description thereof is omitted.

This hot water supply apparatus 30 is one example of a hot water supply apparatus of the present disclosure. The hot water supply apparatus 30 heats the clean water W by using the heated heat medium 4. In hot water supply driving, the process is executed that a heat requirement for heating the clean water W to a set temperature is calculated to supply the heat medium 4 according to the heat requirement. The hot water supply apparatus 30 provides, as depicted in FIG. 4, a heat source device 32, the heat medium circuit 6, the hot water supply circuit 8, etc.

The heat source device 32 is one example of the above described heat source 10, and for example, provided with a burner 34. To this burner 34, fuel gas G is supplied through, for example, a fuel supply pipe 40 having a fuel stop valve 36 and a proportional valve 38, and air for combustion use is also supplied by an air supply fan 42. Combustion of the fuel gas G or stop thereof is controlled by turning on or off of the fuel stop valve 36. The combustion amount of the fuel gas G is adjusted by adjusting the amount of the supplied fuel gas G. The amount of the supplied fuel gas G is adjusted by adjusting the degree of opening the proportional valve 38. In the combustion control of the burner 34, if, for example, the rate of circulating the heat medium 4 increases or decreases, change appears in a detection result of a temperature sensor 44 which is disposed in the heat medium circuit 6. Based on this change of the detection result, optimization of supplying the amount of heat is attempted by controlling a combustion amount so that a set temperature of the heat medium 4 after heat exchange is in Ta, for example, 80° C.

The heat medium circuit 6 provides, as described above, the expansion tank 14 and the circulation pump 16. Furthermore, the heat medium circuit 6 provides, for example, temperature sensors 44 and 112, a primary heat exchanger for a heat medium 46 and a secondary heat exchanger for a heat medium 48. The heat medium circuit 6 connects to the heat exchanger for supplying hot water 12 for exchanging heat for the clean water W as described above.

The temperature sensor 44 is one example of means monitoring the temperature of the heat medium 4 that circulates in the heat medium circuit 6. For example, the temperature sensor 44 is disposed at a lower stream than the primary heat exchanger for a heat medium 46 to measure the temperature of the heat medium 4 before heat exchange for the clean water W. The temperature sensor 112 is one example of means monitoring the temperature of the heat medium 4 that circulates in the heat medium circuit 6, and measures, for example, the temperature of the heat medium 4 in the secondary heat exchanger for a heat medium 48 after heat exchange. A measured result is used for feedback control of the temperature of a heat medium, etc. that controls combustion of the burner 34 so that the heat medium 4 after heat exchange by the heat source device 32 is the predetermined temperature Ta.

The primary heat exchanger for a heat medium 46 is one example of the above described heat exchanger for a heat medium 18. The primary heat exchanger for a heat medium 46 recovers sensible heat mainly from combustion exhaust 50 generated by combustion of the burner 34 to exchange the heat for the heat medium 4. The secondary heat exchanger for a heat medium 48 is one example of the above described heat exchanger for a heat medium 18. The secondary heat exchanger for a heat medium 48 recovers latent heat mainly from the combustion exhaust 50 generated by combustion of the burner 34 to exchange the heat for the heat medium 4.

In the hot water supply circuit 8, for example, a secondary heat exchanger for supplying hot water 52, temperature sensors 54, 56 and 58, a water quantity sensor 60, a water quantity control valve 62 and a bypass pipe 64 are constructed. As described above, the hot water supply circuit 8 connects to the heat exchanger for supplying hot water 12 that exchanges heat between the clean water W and the heat medium 4.

The secondary heat exchanger for supplying hot water 52 recovers latent heat mainly from the combustion exhaust 50 generated by combustion of the burner 34 of the heat source device 32 to exchange the heat for the clean water W. This secondary heat exchanger for supplying hot water 52 is disposed at an upper stream than the heat exchanger for supplying hot water 12. Flowing the clean water W of low temperatures can improve heat efficiency.

The temperature sensors 54, 56 and 58 are one example of temperature detecting means for the clean water W before heating or the hot water HW after heating in the hot water supply circuit 8. For example, the temperature sensor 54 is disposed at an upstream side of the hot water supply circuit 8 to detect the temperature of the supplied clean water W. The temperature sensor 56 is disposed at an exit side of the heat exchanger for supplying hot water 12 to detect the temperature of the hot water HW just after heat exchange for the heat medium 4. The temperature sensor 58 is disposed at a downstream side of the hot water supply circuit 8 to detect, for example, the temperature of the outgoing hot water HW adjusted to a set temperature by being mixed with the clean water W passing through the bypass pipe 64 described below.

The water quantity sensor 60 is one example of a water flow detection and water quantity detection means. The water quantity sensor 60 determines a driving request of the hot water supply apparatus 30 by detecting passing water in the hot water supply circuit 8 as described above. Calculation of a heat requirement is executed based on the detected flow quantity.

The water quantity control valve 62 is one example of hot water supply quantity control means. For example, the water quantity control valve 62 is disposed at an upstream side of the hot water supply circuit 8, and controls the outgoing hot water quantity by controlling the quantity of the supplied clean water W.

The bypass pipe 64 is one example of a pipe passage introducing the clean water W of low temperatures into a downstream side of the hot water supply circuit 8. The bypass pipe 64 is means connecting, for example, an upstream side of the hot water supply circuit 8 with a downstream side thereof, bypasses the heat exchanger for supplying hot water 12, and mixes the clean water W and the hot water HW of high temperatures. For this bypass pipe 64, a mixing valve 66 which constructs mixing means adjusting a mixing ratio of the clean water W of low temperatures to the hot water HW of high temperatures is provided. The mixing valve 66 adjusts the temperature of outgoing hot water.

In this hot water supply apparatus 30, for example, replenishment pipe 68 for replenishing the expansion tank 14 with the heat medium 4, and an open and close valve 70 controlling replenishment are disposed. In the expansion tank 14, a level sensor 72 detecting the water level of the heat medium 4 is disposed to detect a level Low and a level High. By the detection, if the level Low is detected, antifreeze or the like is replenished as the heat medium 4.

Other than the above described antifreeze, for example, purified water or the clean water W of predetermine quality may be used as this heat medium 4. In this case, for example, the above described replenishment pipe 68 may be connected to the hot water supply circuit 8 to execute replenishment with the clean water W.

In order to recover, for example, a drain 74, which is acidified, generated from latent heat recovery by the secondary heat exchanger for a heat medium 48 and the secondary heat exchanger for supplying hot water 52, a drain receiver 76 and a drain pipe passage 78 may be disposed in the heat source device 32. A neutralization unit 80 for accumulating and neutralizing the recovered drain 74 may be disposed.

For the hot water supply apparatus 30, a control unit 90 and a remote-control unit 92 for controlling hot water supply are provided. The control unit 90 executes control of circulating the heat medium 4, and executes a changing process of the temperature of supplied hot water, etc. according to setting operation of a user.

Figure 5:
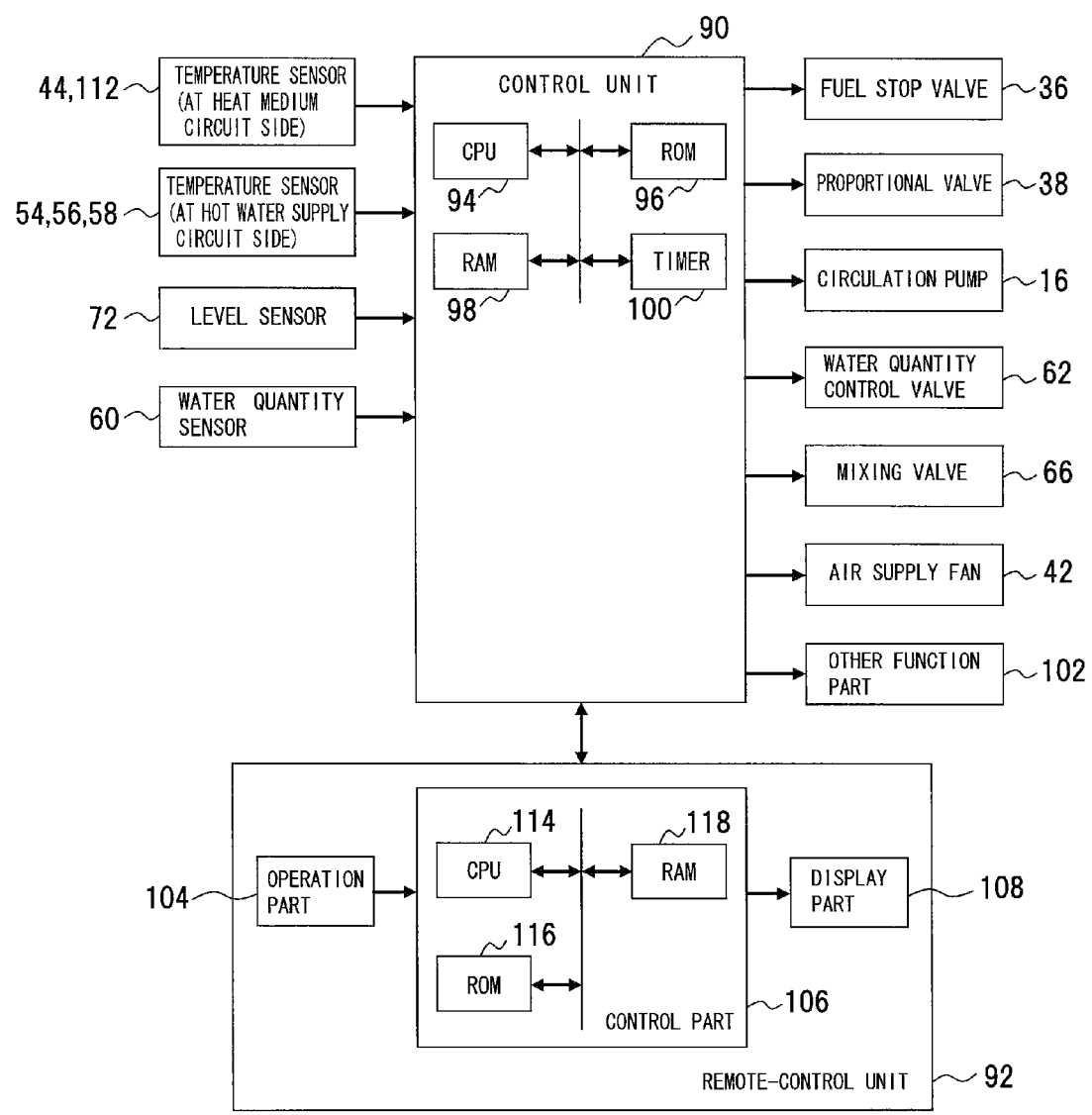
FIG. 5 depicts an example of structure of a control unit of a hot water supply apparatus.

The structure of a control unit of a hot water supply apparatus is described with reference to FIG. 5. FIG. 5 depicts an example of the structure of a control unit of a hot water supply apparatus. Structure depicted in FIG. 5 is one example, and the present invention is not limited to such structure.

The control unit 90 of the hot water supply apparatus 30 is constituted of a computer, and includes for example, a CPU (Central Processing Unit) 94, a ROM (Read Only Memory) 96, a RAM (Random Access Memory) 98 and a timer 100.

The CPU 94 is one example of calculation processing means for executing a hot water supply driving control program, etc. For example, the CPU 94 executes processes of an OS (Operating System) and other programs such as a hot water supply control program and a combustion control program which are recorded in the ROM 96, etc. and executes the above described calculation of a heat requirement, etc.

The ROM 96 is means storing the OS and a program such as a control program of the hot water supply apparatus 30, and is one example of means storing measured temperature data, a heat requirement, rotating speed data of the circulation pump 16, etc. The RAM 98 constitutes a work area for executing each control program, etc.

The ROM 96 may be constituted of, for example, an EEPROM (Electrically Erasable and Programmable Read Only Memory) in which contents can be rewritten electrically.

A program executed in a hot water supplying process, etc. is not limited to a program stored in the ROM 96, etc. For example, a program stored in a computer-readable recording medium such as a magnetic disk, a flexible disk, an optical disk and a magnetic optical disk may be used. A program, etc. may be read in from a server, a database, etc. on a network to be used.

The timer 100 is one example of timekeeping means of driving control timing of the hot water supply apparatus 30, elapsed time, etc. The timer 100 may be constituted of, for example, a program.

Into this control unit 90, for example, temperature information of the clean water W and the hot water HW in the hot water supply circuit 8 is taken from the temperature sensors 54, 56 and 58, and temperature information of the heat medium 4 in the heat medium circuit 6 is taken from the temperature sensors 44 and 112. Water quantity information of the clean water W is taken from the water quantity sensor 60, and water level information (High, Low and COM) of the heat medium 4 in the expansion tank 14, etc. is taken from the level sensor 72.

With using various pieces of taken information, the above described processing program is executed to output control commands to, for example, the fuel stop valve 36, the proportional valve 38, the circulation pump 16, the water quantity control valve 62, the mixing valve 66, the air supply fan 42, other function unit 102, etc.

The control unit 90 connects to the remote-control unit 92 for supplying hot water. The control unit 90 takes operation commands by a user, and sends display information such as a driving state to the remote-control unit 92 side. The control unit 90 and the remote-control unit 92 are connected by, for example, wire such as a communication cable or by radio. This remote-control unit 92 provides, for example, an operation part 104, a control part 106 and a display part 108.

The operation part 104 is one example of operation means for the hot water supply apparatus 30. The operation part 104 is constituted of, for example, a driving switch and a temperature adjustment switch, etc. Driving operation for the hot water supply apparatus 30 and changing commands of a set temperature are inputted.

The control part 106 is one example of control means of the remote-control unit 92. The control part 106 sends, for example, inputted operation commands to the control unit 90 side of the hot water supply apparatus 30, and takes driving information of the hot water supply apparatus 30 from the control unit 90 to display the information on the display part 180. This control part 106 includes, for example, a CPU 114, a ROM 116 and a RAM 118.

The display part 108 is means displaying a set temperature and a driving state. The display part 108 may be constituted of, for example, an LCD (Liquid Crystal Display) displaying a set temperature, an LED (Light Emitting Diode) expressing a combustion state of the burner 34 in hot water supply driving, etc.

A Specific example of a driving control process of the hot water supply apparatus 30 in the above described structure is explained below.

(1) Hot Water Supply Driving

For example, the operation part 104 such as a driving switch of the remote-control unit 92 is operated, and the clean water W flows into the hot water supply circuit 8 by turning on a hot water tap 110 (FIG. 4). Whether there is a hot water supply request is determined by detecting a water flow with the water quantity sensor 60. According to the determination of a hot water supply request, the circulation pump 16 and the air supply fan 42 are operated, and combustion of the burner 34 is started. In combustion control, based on a setting temperature stored in the remote-control unit 92 or the control unit 90, a detected temperature by the temperature sensor 54 and a detected water quantity of the water quantity sensor 60, a heat requirement is calculated. Thus, required "gou" for outgoing hot water is calculated. Here, "gou", which is a unit used in Japan, expresses the ability to supply hot water. "Gou" uses the standard, which is how much liters hot water of "a temperature of water plus 25° C." can be supplied per minute. If expressed with using the ability in combustion of a hot water supply apparatus as a standard, "1 'gou'" can perform combustion of the amount of heat (kCal) that increases the temperature of water of 1 liter by 25° C. per minute. This "gou" is calculated by using, for example, a formula (1).

$$\text{``gou''} = (T_s - T_i) * Q / 25 \quad (1)$$

Here, Ts is a target (set) temperature, Ti is an entrance water temperature and Q is a flow rate.

In order to exchange the amount of heat of this required "gou" of outgoing hot water for the clean water W, a necessary flow rate of the heat medium 4 is calculated to adjust the circulation pump 16. Thereby, control is performed so that the temperature of supplied hot water is a set temperature.

As control at hot water supply side, in the hot water supply circuit 8, the temperature of outgoing hot clean water W, to which heat exchange is executed in the heat exchanger for hot water supply 12, is detected by the temperature sensor 56. The degree of opening the mixing valve 66 is adjusted so that this temperature of outgoing hot water is the same as a set temperature. If the quantity of outgoing hot water is excessive, the degree of opening the water quantity control valve 62 is lowered to control the quantity of outgoing hot water properly. This hot water supply control is not limited to the control based on "gou", and the control based on, for example, the calculated amount of heat may be executed.

(2) Warmth Keeping Drive

When there is no driving request for the hot water supply apparatus 30, warmth keeping driving may be executed in order to shorten rising time in outgoing hot water next time. This warmth keeping driving is that the heat medium 4 in the expansion tank 14 and the heat medium circuit 6 is heated to the predetermined temperature Ta, for example, 80° C. for a predetermined time. When hot water supply driving is started next time, efficiency for raising a heating temperature can be improved by using the heat medium 4, warmth of which is kept, for hot water supply driving the until the start of combustion of the burner 34.

A warmth keeping driving is started, for example, when hot water supply demand disappears. For example, after hot water supply driving is ended, the heat source device 32 and the circulation pump 16 are continuously operated to heat the heat medium 4 in the secondary heat exchanger for a heat medium 48 and the primary heat exchanger for a heat medium 46. When the heat medium 4 in the heat medium circuit 6 and the expansion tank 14 gets equal to or over the predetermined temperature Ta, for example, 80 (° C.), the fuel stop valve 36 is turned off to stop combustion of the burner 34. When the heat medium 4 drops equally to or under a predetermined temperature Tb, for example, 78° C. according to time elapsing, the fuel stop valve 36 is turned on to start combustion of the burner 34. Thus, the heat medium 4 in the heat medium circuit 6 is heated so as to get equal to or over the predetermined temperature Ta. If a predetermine time has passed since warmth keeping driving was started, combustion of the burner 34 is stopped, the circulation pump 16 is stopped, and warmth keeping driving is ended.

Figure 6:
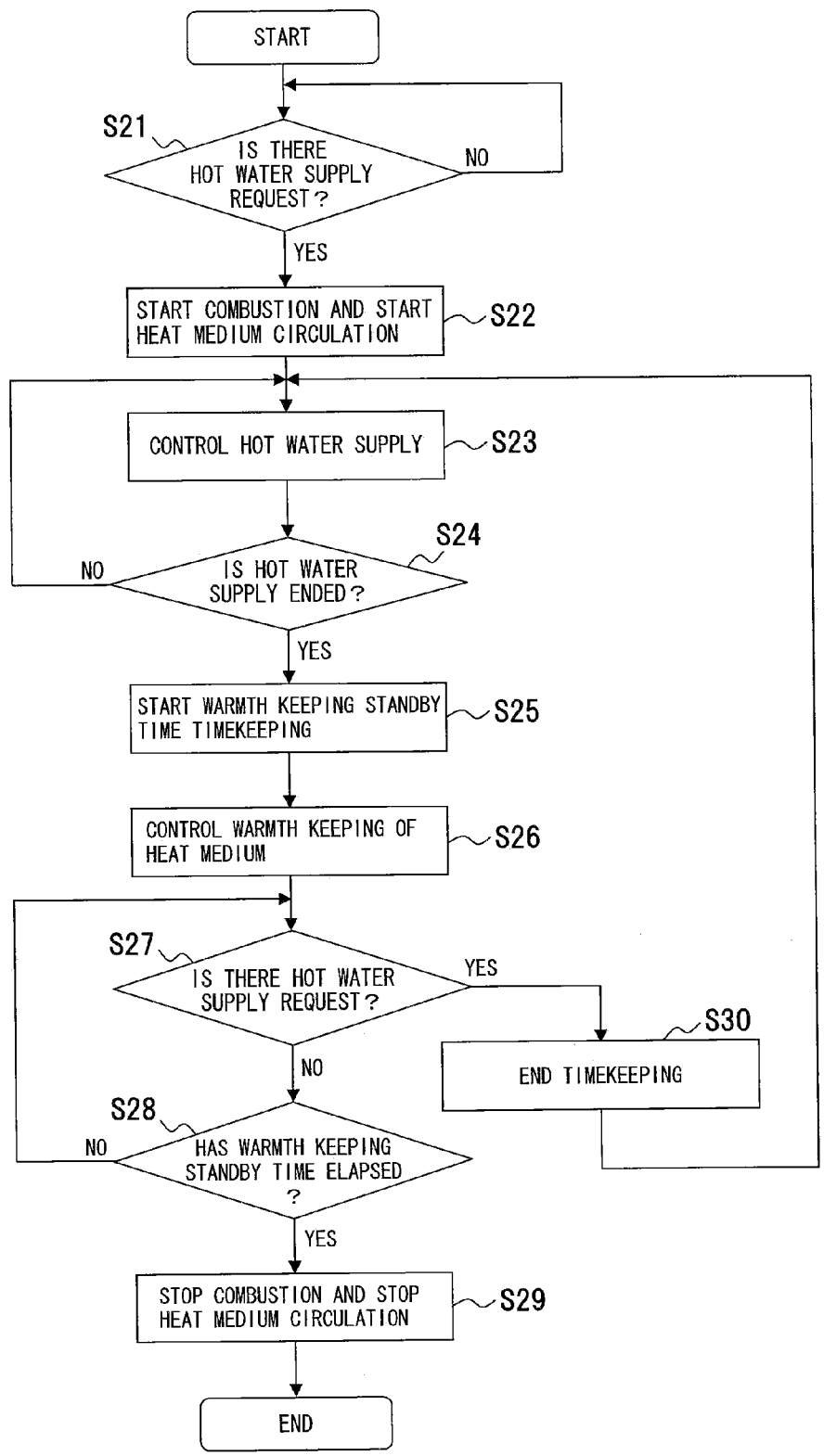
FIG. 6 is a flowchart depicting driving operation of the hot water supply apparatus according to the second embodiment.

Basic driving control operation of a hot water supply apparatus is described with reference to FIG. 6. FIG. 6 is a flowchart depicting driving operation of the hot water supply apparatus according to the second embodiment. Processing contents, processing procedure, etc. depicted in FIG. 6 is one example, and the present invention is not limited to them.

This driving control of a hot water supply apparatus is one example of a heat medium control method of the present disclosure, and includes a heat medium heating control routine according to a hot water supply request (steps S21 to S24) and a warmth keeping operation routine after hot water supply operation is ended (steps S25 to S30).

After driving is started, it is determined whether there is a hot water supply request (step S21). The presence of this hot water supply request is determined, as described above, by input operation to the operation part 104 or the flow detection of the clean water W.

When there is a hot water supply request (YES of step S21), the circulation pump 16 is driven and combustion of the burner 34 is started to execute heat medium circulation (step S22). The hot water supply control is executed that the heat of the heat medium 4 heated by the heat exchanger for a heat medium 46 and the secondary heat exchanger for a heat medium 48 is exchanged for the clean water W by the heat exchanger for supplying hot water 12 to supply the outgoing hot water HW (step S23).

During hot water supply driving, whether there is a hot water supply request or not is monitored, for example, any time or every predetermined timing, and whether hot water supply is ended is determined (step S24). The determination whether hot water supply is ended may be executed as the above described determination whether there is a hot water supply request or not (step S21). When hot water supply is ended (YES of step S24), the process moves to a warmth keeping process of the heat medium 4.

If it is determined that hot water supply is ended, the timer 100 is booted, timekeeping of warmth keeping stand-by time tw is started (step S25), and the process moves to warmth keeping control of the heat medium 4 (step S26). In warmth keeping control, as described above, heating and circulation are executed so as to keep the heat medium 4 around the predetermined temperature Ta.

During executing warmth keeping control, whether there is a hot water supply request or not is continuously monitored (step S27). If there is no hot water supply request (NO of step S27), warmth keeping control is maintained, and whether the warmth keeping stand-by time tw has elapsed or not is monitored (step S28). If the warmth keeping stand-by time tw is not elapsed (NO of step S28), warmth keeping control is still executed. If the warmth keeping stand-by time tw is elapsed, combustion of the burner 34 is stopped, the fuel stop valve 36 and the proportional valve 38 are turned off, and the circulation pump 16 is stopped to stop heat medium circulation heating as the end of warmth keeping control (step S29).

When there is a hot water supply request during warmth keeping stand-by time (YES of step S27), timekeeping by the timer 100 is ended (step S30), and hot water supply control is restarted (step S23).

Figure 7:
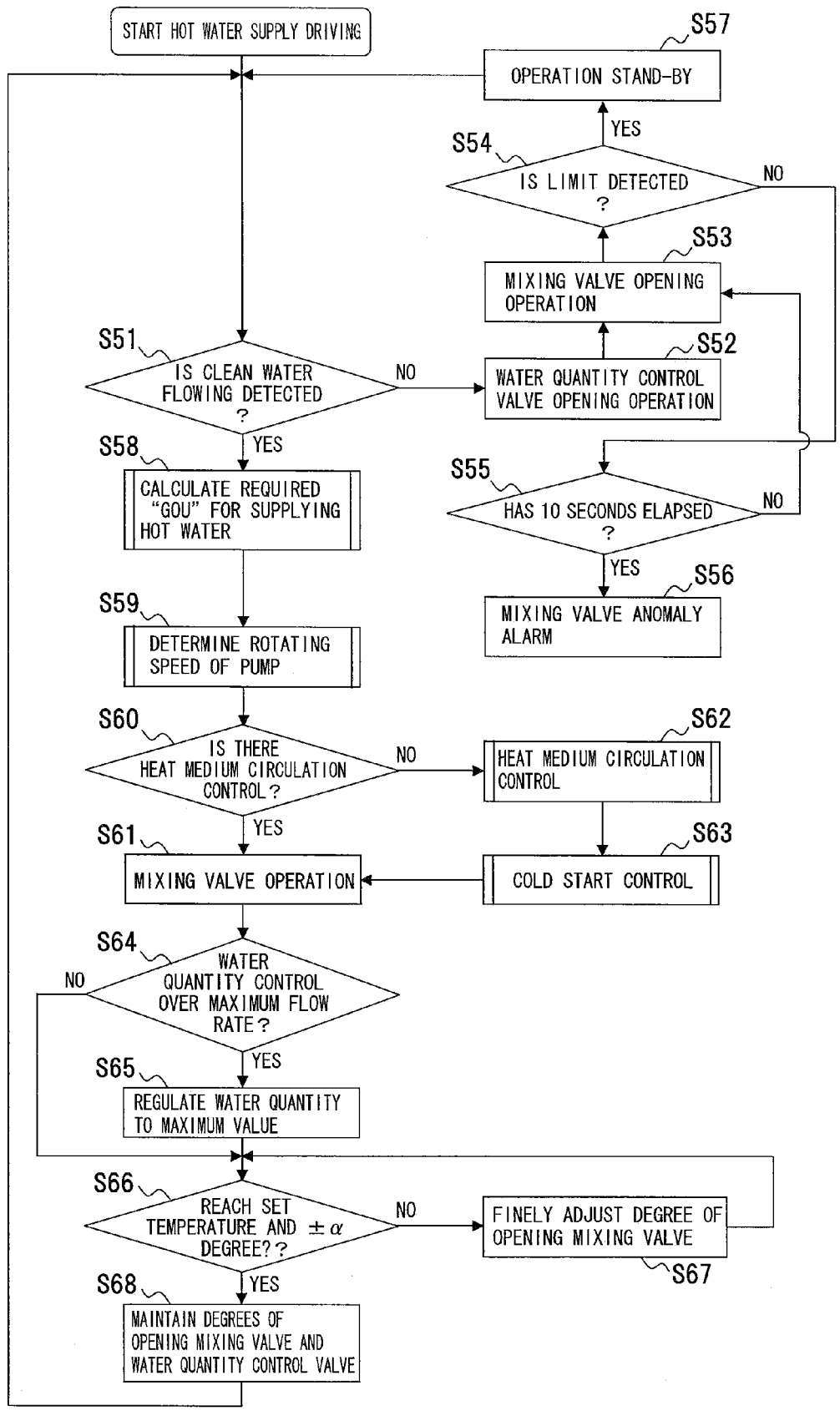
FIG. 7 is a flowchart depicting a control process of hot water supply driving.
Figure 8:
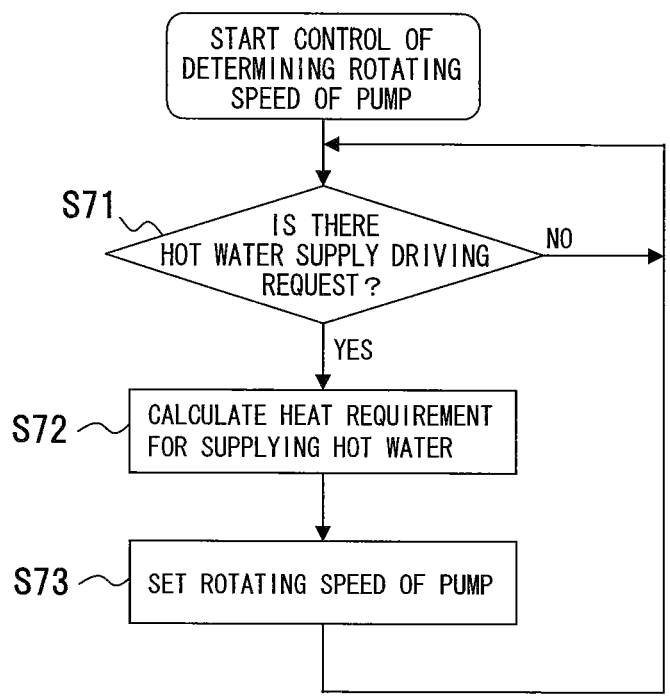
FIG. 8 is a flowchart depicting control of the rotating speed of a pump.
Figure 9:
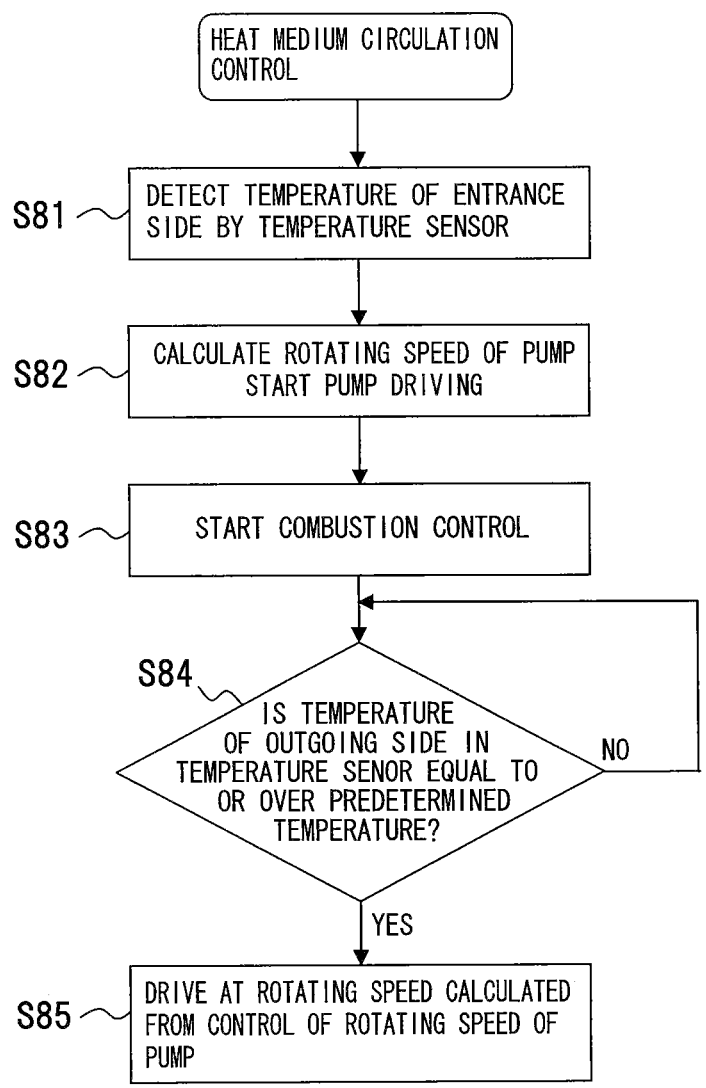
FIG. 9 is a flowchart depicting control of heat medium circulation.
Figure 10:
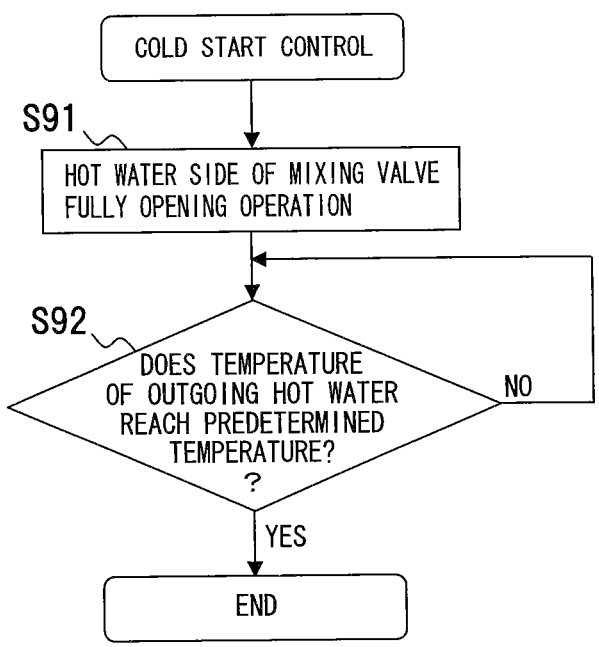
FIG. 10 is a flowchart depicting cold start control.

Specific example of a hot water supply control process is described with reference to FIGS. 7 to 10. FIG. 7 is a flowchart depicting an example of hot water supply driving control, FIG. 8 is a flowchart of control of the rotating speed of a pump, FIG. 9 is a flowchart depicting heat medium circulation control, and FIG. 10 is a flowchart depicting cold start control. Processing contents, processing procedure, etc. depicted in FIGS. 7 to 10 are one example, and the present invention is not limited to them.

This hot water supply control is one example of a heat medium control method of the present disclosure, and includes a routine of detecting trouble of a mixing valve before hot water supply is started (steps S51 to S57), a routine of calculating required "gou" and controlling the rotating speed of a circulation pump (steps S58 and S59). Also, a routine of controlling hot water supply driving for a set temperature (steps S60 to S68) is included.

This hot water supply apparatus 30 adjusts the temperature of supplied hot water by the degree of opening the mixing valve 66. In order to prevent hot water supply of very high temperatures due to trouble of the mixing valve 66, etc., anomaly detection of the mixing valve 66 is executed during preparing hot water supply or stopping hot water supply. If anomaly is detected, hot water supply driving is suspended.

Whether the water quantity sensor 60 detects flowing water or not is determined (step S51), and it is confirmed that there is no hot water supply request before execution of the detection of trouble of the mixing valve 66 is started. When there is no flowing water (NO of step S51), opening operation commands are outputted from the control unit 90 to the water quantity control valve 62 and the mixing valve 66 (steps S52 and S53). Thereby, the mixing valve 66 is opened so as to reach a full opening position (bypass full opening).

For this opening operation commands, an opened state of the mixing valve 66 is monitored. By monitoring means, whether the limit of full opening is detected is determined (step S54). If the limit of full opening is not detected (NO of step S54), monitoring is repeatedly executed until a predetermined time tc, for example, 10 seconds have elapsed (NO of step S55). If the predetermined time tc, for example, 10 seconds have elapsed (YES of step S55), a mixing valve anomaly alarm is outputted (step S56). This mixing valve anomaly alarm may, for example, execute anomaly announcement by using the display part 108 of the remote-control unit 92. Since the mixing valve 66 is anomaly, the process may be executed that the function of the hot water supply apparatus 30 are locked.

When the limit of full opening is detected within the predetermined time tc (YES of step S54), the process returns to a standby state (step S57). That is, when combustion of the hot water supply apparatus 30 is stopped, the mixing valve 66 is kept in a full opening state by detecting the limit within a predetermined time.

If it is determined that there is a driving request by detecting the flowing clean water W (YES of step S51), the process moves to a process of calculating required "gou" for supplying hot water (step S58) and a process of determining the rotating speed of a pump (step S59).

Required "gou" for supplying hot water is calculated by using, for example, the above described formula (1) for a detected supplied water temperature, a flow rate, a set temperature, etc. as described above. By this required "gou", the rotating speed of the circulation pump 16 is determined. In this determination of the rotating speed, it is determined whether required "gou" for supplying hot water is under a predetermined "gou", for example, 12 "gou" or not. If the required "gou" is under a predetermined "gou", the rotating speed of the circulation pump 16 may be controlled to slow rotation, and if the required "gou" is equal to or over a predetermined "gou", the rotating speed thereof may be controlled to fast rotation.

Whether heat medium circulation control is started or not is determined (step S60). Heat medium circulation control instructs hot water supply operation during circulation of the heat medium 4 at the predetermined temperature Ta, for example, 80° C. That is, circulation of the heat medium 4 adjusted to a predetermined temperature heats the clean water W staying around the heat exchanger for supplying hot water 12 and keeps its warmth. Mixing this staying water and the clean water W can supply outgoing hot water and heat the clean water W rapidly. In this process, the mixing valve 66 and the water quantity control valve 62 are controlled to adjust the clean water W to a set temperature.

In this hot water supply driving, the water quantity control valve 62 is controlled so that the quantity of outgoing hot water is the maximum flow rate. The mixing valve 66 is controlled so as to execute the mixing control that the temperature of outgoing hot water is within the range of setting temperatures by a mixing ratio of the hot water HW to the clean water W.

When heat medium circulation control is executed (YES of step S60), operation control of the mixing valve 66 is executed (step S61). In this control, the temperature of the hot water HW which is supplied by operating the mixing valve 66 is adjusted to a set temperature. Based on detection outputs from the temperature sensors 54 and 56, entrance water quantity, a set temperature, etc., the preset degree of opening a valve, by experiments, etc., is set. For calculated required "gou", the mixing valve 66 is adjusted so that the hot water HW is a predetermined temperature by using, for example, basic data obtained from experiments, etc. stored in storing means. That is, feed-forward control is executed.

If heat medium circulation control is not started (NO of step S60), heat medium circulation control is executed (step S62) to execute cold start control (step S63). Cold start control executes rotating speed control of a pump, as described below, in order to accelerate raising the temperature of the heat medium 4. After cold start control is executed, the mixing valve 66 is operated (step S61).

Whether water quantity is controlled so as to be over the maximum flow rate or not is determined (step S64). If over the maximum flow rate (YES of step S64), water quantity is regulated to the maximum value (step S65). That is, when supplied hot water quantity is over the maximum flow rate that the water quantity control valve 62 can supply, the degree of opening a valve is regulated so that the quantity is the maximum flow rate. When supplied hot water quantity is under the maximum flow rate, the degree of opening a valve is maintained.

In this case:

maximum flow rate={(temperature of supplied hot water-temperature of supplied water)/(set temperature-temperature of supplied water)}*detected flow rate (2)

It is determined whether the temperature of supplied hot water reaches within the range of a set temperature and ±α degrees or not (step S66). If the temperature does not reach within this range of temperatures (NO of step S66), the degree of opening the mixing valve 66 is finely adjusted so that the temperature of supplied hot water is a set temperature (step S67), and the temperature of hot water is allowed to reach within the range of a set temperature and ±α degrees. That is, in this case, what is called feedback control is executed that when a set temperature is not reached by the above described mixing valve operation by feed-forward control (step S61), the mixing valve 66 is operationally controlled based on the temperature detected by the temperature sensor 58.

When it is determined whether the temperature of outgoing hot water reaches within the range of a set temperature and ±α degrees (YES of step S66), the degree of opening the water quantity control valve 62 and the mixing valve 66 are maintained (step S68).

The above described hot water supply control process is repeatedly executed during driving operation of the hot water supply apparatus 30. For example, even if one processing step is not completed, next processing step may be executed.

One example of the above described control process of determining the rotating speed of a pump is depicted in FIG. 8.

The hot water supply apparatus 30 changes the rotating speed of a pump according to hot water demand, increases and decreases combustion amount of the burner 34 accompanying this change of the rotating speed, and changes the quantity of circulating the heat medium 4. Thus, the proper amount of heat is provided and the clean water W is heated to a set temperature.

In rotating speed control of the circulation pump 16, whether there is a hot water supply driving request or not is determined (step S71). If there is a hot water supply driving request (YES of step S71), a heat requirement for supplying hot water is calculated from a set temperature, an entrance water temperature and entrance water quantity (step S72). Thus, the rotating speed of the circulation pump 16 is set so as to be able to obtain a necessary flow rate (step S73). For example, as depicted in FIG. 3, the rotating speed of the circulation pump 16 may be determined from a necessary flow rate in proportion to a heat requirement for supplying hot water.

In heat medium circulation control, for example, as depicted in FIG. 9, the temperature of an entrance side to the primary heat exchanger for a heat medium 46 is detected by the temperature sensor 112 (FIG. 4) (step S81), the rotating speed of the circulation pump 16 is calculated, and pump driving is started (step S82). This rotating speed of a pump is determined so that, for example, a flow rate is calculated from the rotating speed of a pump obtained from basic experiments in advance, and the temperature of an outgoing side of the heat exchanger for a heat medium 46 is the predetermined temperature Ta, for example, 80° C.

When combustion control of the burner 34 is started, the temperature of outgoing side of the primary heat exchanger for a heat medium 46 is detected by the temperature sensor 44, and it is determined whether the detected temperature is equal to or over the predetermined temperature Ta or not (step S84). If the temperature of the heat medium 4 is equal to or over the predetermined temperature Ta (YES of step S84), combustion control is executed at the rotating speed calculated in control of the rotating speed of a pump, and control of the rotating speed of the circulation pump 16 is executed (step S85).

Cold start control is described with reference to FIG. 10.

In the hot water supply apparatus 30 of the present disclosure, the temperature of the heat medium 4 is raised as a heat source heating the clean water W, and with this amount of heat of the heat medium 4, the heat exchanger for supplying hot water 12 exchanges heat for the clean water W. Therefore, it takes some time to supply hot water at a set temperature. Thus, as cold start control, for example, the processes are executed that the rotating speed of pump is controlled in order to accelerate raising the temperature of the heat medium 4, and that the mixing valve 66 is temporarily turned off (bypass closing) in order to accelerate the speed of heating the clean water W.

As depicted in FIG. 10, the hot water side of the mixing valve 66 of a is fully opened (step S91), and whether the temperature of outgoing hot water reaches a predetermined temperature or not is determined (step S92). The hot water side of the mixing valve 66 is being opened till the temperature of outgoing hot water reaches a predetermined temperature. When the temperature of outgoing hot water reaches a predetermined temperature (YES of step S92), cold start control is ended. In this case, the hot water side of the mixing valve 66 is fully opened till the temperature of outgoing hot water reaches a predetermined temperature Tc, for example, 37° C. to aid a boot. After reaching the predetermined temperature Tc, the process may be moved to normal control.

According to such structure, as described above, heating the clean water W with the heat medium 4 indirectly can prevent partial boiling. Hot water can be supplied irrelevantly to the difference of the quality, etc. of the clean water W. A combustion control process, a process of determining the rotating speed of a pump and cold start control can attempt reduction of NOx emission and power saving. Moreover, response to heating demand can be quickened.

According to the above embodiments, features or advantages are listed as follows.

(1) The hot water supply apparatus of the present disclosure can control heat medium heating according to control of the rotating speed of the pump 16 to be able to respond to heating demand immediately.

(2) This hot water supply apparatus 30 has the feature of using, for example, antifreeze as the heat medium 4. That is, since the quality of the heat medium 4 gets uniform by using antifreeze, partial boiling due to a partial change of a boiling point can be prevented.

(3) The secondary heat exchanger for a heat medium 48 is provided for the heat exchanger for a heat medium 18, and latent heat which the combustion exhaust 50 passing through first heat exchanging means (the primary heat exchanger for a heat medium 46) has is recovered to heat the heat medium 4. Thereby, heat efficiency can be improved.

(4) Latent heat recovering heat exchange means (secondary heat exchanger for supplying hot water 52) recovering latent heat which the combustion exhaust 50 passing through the first heat exchanging means (primary heat exchanger for a heat medium 46) has, and heating the clean water W is provided for the hot water supply circuit 8. Thereby, efficiency of heating the clean water W can be improved.

(5) Heating the clean water W indirectly can prevent partial boiling in the hot water supply circuit 8.

(6) The heat medium 4 is heated by a heat source such as combustion heat of a burner, electric heat and exhaust heat to be circulated, and the clean water W is heated by using the heat of the heat medium 4. Thereby, combustion time can be shortened to attempt high efficiency, reduction of NOx emission and power consumption saving of a pump.

(7) Keeping warmth of the heat medium 4 in the heat medium circuit 6 and the expansion tank 14 can accelerate the heating speed when hot water supply is started to attempt rapid hot water supply. Since hot water quantity necessary for supplying hot water can be ensured in advance, hot water can be supplied stably.

Figure 11:
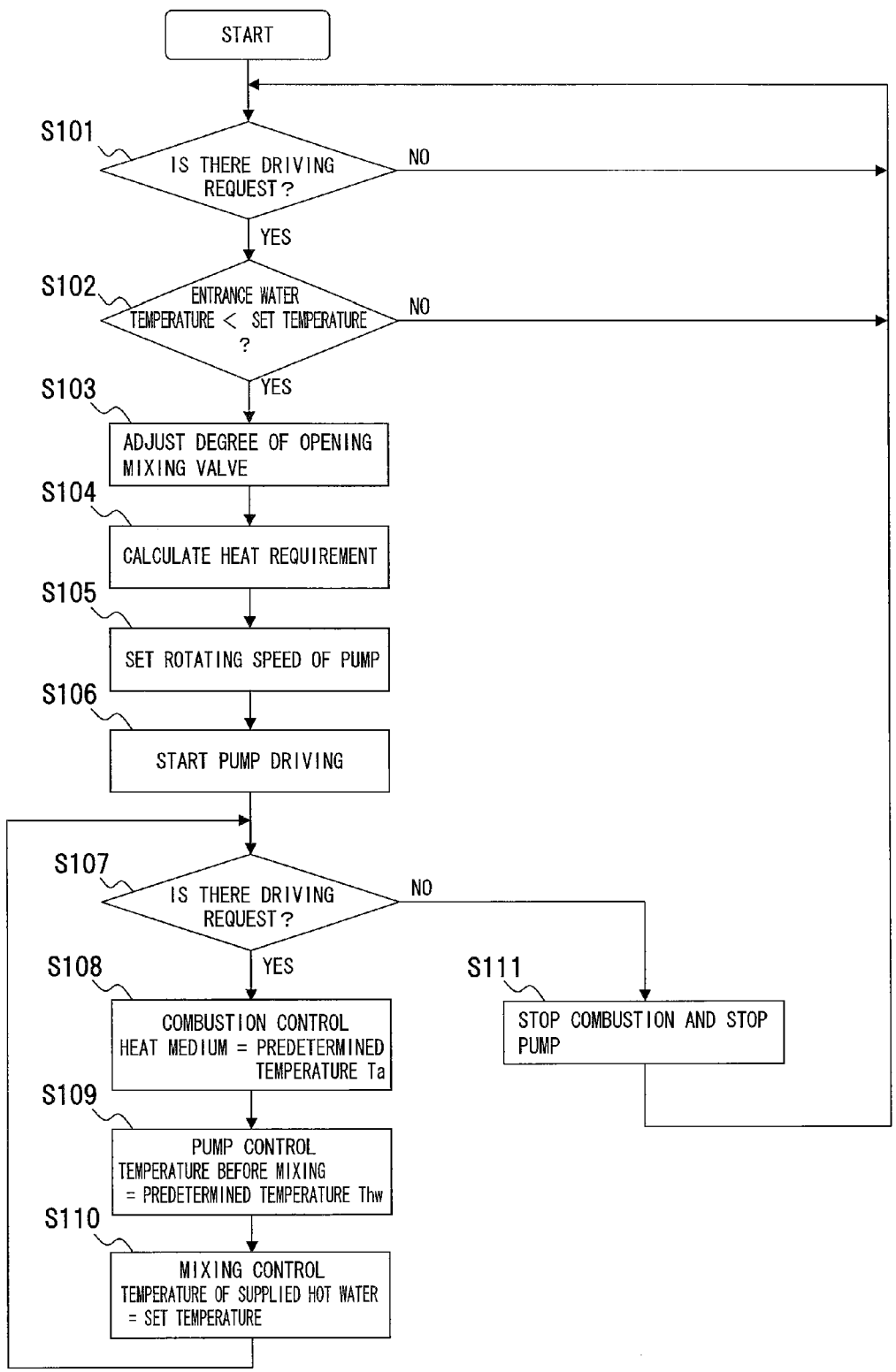
FIG. 11 is a flowchart depicting a hot water supply control process according to another embodiment.

Other Embodiments (1) In the above embodiment, FIGS. 6 and 7 are presented as to driving control of a hot water supply apparatus. The present application is not limited to the above, and, for example, a process depicted in FIG. 11 may be executed. In this process, a temperature Thw of hot water HW after heat exchange is set to execute combustion control and pump control. Thus, for example, whether there is a driving request is determined by water flowing detection by a water quantity sensor 60, etc. (step S101). If a set supplied hot water temperature (a set temperature) is higher than the temperature of entrance clean water W (YES of step S102), hot water supply control is started.

For example, 75° C. which is higher than a set temperature of supplied hot water is set as the predetermined temperature Thw of the hot water HW, heat of which is exchanged by a heat exchanger for supplying hot water 12. In order to make the hot water HW of this temperature Thw a set temperature of supplied hot water, a mixing ratio of the clean water W is calculated to adjust the degree of opening a mixing valve (step S103).

As circulation control of a heat medium 4, as described above, a heat requirement is calculated by using the entrance temperature of the clean water W, a set temperature of supplied hot water and a detected result of the flow rate of supplied hot water by the water quantity sensor (step S104). The flow rate of the heat medium 4 is calculated from the calculated amount of heat and a predetermined temperature Ta of the heat medium 4 to set the rotating speed of a circulation pump 16 (step S105). Thus, driving of the circulation pump 16 is started (step S106).

If a hot water supply driving request continues after circulation of the heat medium 4 is started (YES of step S107), combustion control of a burner 34 is executed so as to retain the predetermined temperature Ta of the heat medium 4 after heating (step S108). In order to circulate the heat medium 4 so that the temperature of the hot water HW after heat exchange is the predetermined temperature Thw, rotating speed control of the circulation pump 16 is executed (step S109). The mixing control is executed that the degree of opening the mixing valve 66 is adjusted so that the temperature of the hot water HW after mixing is a supplied hot water set temperature (step S110).

If there is no driving request (NO of step S107), driving of the burner 34 and the circulation pump 16 is stopped (step S111). According to such structure, the same effects as the above embodiment can also be obtained.

(2) In the above embodiment, the secondary heat exchanger for supplying hot water 52 that recovers latent heat of the combustion exhaust 50 is constituted in order to improve heat efficiency for supplying hot water. The structure not having the above may be used.

(3) In the above embodiment, the feed-forward control executing pump control, combustion control, control of the mixing valve 66, etc. according to the calculated amount of heat and the feedback control such as monitoring the temperature of a heat medium during hot water supply driving, monitoring the temperature of supplied hot water and monitoring the temperature before mixing are used together. The present application is not limited to the above. For example, the structure may be used that the circulation pump 16 is operated at the predetermined rotating speed according to a hot water supply request, or after combustion of the heat source device 32 is started, feedback control controls the temperature to a supplied hot water set temperature.

While the most preferred embodiments of the present invention have been described hereinabove, the present invention is not limited to the above embodiments, and it is a matter of course that various variations and modifications can be made by those skilled in the art within the scope of the claims without departing from the spirit of the invention disclosed herein, and needless to say, such variations and modifications are also encompassed in the scope of the present invention.

The present invention prevents partial boiling of clean water by heating a heat medium, and heating the clean water indirectly with using the heat medium. Also, the present invention can shorten combustion time of a heat source that heats a heat medium to realize high efficiency, and can quicken response to hot water supply demand. Thus, the present invention is useful.

What is claimed is:

1. A hot water supply apparatus that exchanges combustion heat of fuel gas for heat of a heat medium, the hot water supply apparatus exchanging the heat of the heat medium for heat of clean water, carrying out a hot water supply with the clean water, and comprising:
   a heat medium circulation path that circulates the heat medium, which is different from clean water;
   a tank that accumulates the heat medium circulating in the heat medium circulation path;
   a heat medium pump that rotates to circulate the heat medium in the heat medium circulation path;
   a burner that combusts the fuel gas supplied thereto and generates the combustion heat, the combustion heat being adjusted according to an amount of the fuel gas;

a heat medium heat exchanger that exchanges the combustion heat generated by the burner, for heat of the heat medium circulating in the heat medium circulation path when the heat medium pump operates;

a hot water supply heat exchanger that exchanges the heat of the heat medium for heat of the clean water that is supplied thereto when hot water supply is requested;

a mixing valve that mixes the clean water after heat exchange by the hot water supply heat exchanger and the clean water before the heat exchange by the hot water supply heat exchanger, a mixing ratio of both the clean water after the heat exchange and the clean water before the heat exchange being able to be adjusted;

an entrance temperature detection means that detects a temperature of the clean water flowing into the hot water supply heat exchanger;

a flow rate detection means that detects a flow rate of the clean water flowing into the hot water supply heat exchanger;

an outgoing hot water temperature detection means that detects the temperature of the clean water after the heat exchange by the hot water supply heat exchanger; and a control unit that receives a hot water supply request, controls a temperature of the heat medium by adjusting a combustion amount of the burner so that the temperature of the heat medium after heat exchange by the heat medium heat exchanger becomes a first temperature being constant, the heat medium heat exchanger exchanging the combustion heat for the heat of the heat medium, controls the clean water by adjusting rotating speed of the heat medium pump so that the temperature of the clean water becomes a second temperature that is lower than the first temperature by a predetermined temperature and higher than a set temperature of supplied hot water, the hot water supply heat exchanger exchanging the heat of the heat medium for the heat of the clean water, and adjusts the mixing ratio set to the mixing valve, which mixes the clean water of which temperature is the second temperature and the clean water before the heat exchange by the hot water supply heat exchanger, so as to control a temperature of the clean water so that the temperature of the clean water becomes the set temperature of supplied hot water, wherein the first temperature is controlled so that the first temperature becomes 80 degrees Celsius and the second temperature is controlled so that the second temperature becomes 75 degrees Celsius.

2. The hot water supply apparatus of claim 1, further comprising:

a heat medium temperature detection means that detects a temperature of the heat medium flowing into the hot water supply heat exchanger, wherein the control unit controls the temperature of the heat medium so that the temperature of the heat medium becomes the first temperature, by adjusting the combustion heat by the burner according to the temperature of the heat medium, the temperature being detected by the heat medium temperature detection means.

3. The hot water supply apparatus of claim 1, further comprising:

a timer that performs timekeeping of elapsed time from an end of the hot water supply, wherein the control unit operates the burner and the heat medium pump and controls the heat medium so that the temperature of the heat medium becomes the first temperature from the end of the hot water supply to receiving the hot water supply request or until the predetermined time has elapsed since the end of the hot water supply.

4. The hot water supply apparatus of claim 1, wherein the heat medium is antifreeze.

5. The hot water supply apparatus of claim 1, wherein the heat medium heat exchanger or the hot water supply heat exchanger includes a primary heat exchanger and a secondary heat exchanger, the primary heat exchanger exchanging the combustion heat for the heat of the heat medium or exchanging the heat of the heat medium for the heat of the clean water, the secondary heat exchanger exchanging at least latent heat of the combustion heat for the heat of the clean water or the heat medium.

* * * * *